(12) United States Patent
Fella, Jr. et al.

(10) Patent No.: US 9,166,876 B2
(45) Date of Patent: Oct. 20, 2015

(54) POWER COMMUNICATIONS MONITOR FOR POWER LINE CARRIER AND AUDIO TONE COMMUNICATION SYSTEMS

(71) Applicant: Powercomm Solutions, LLC, Flemington, NJ (US)

(72) Inventors: Raymond M. Fella, Jr., Flemington, NJ (US); Alan R. Jayson, Somerset, NJ (US)

(73) Assignee: POWERCOMM SOLUTIONS, LLC, Flemington, NJ (US)

( * ) Notice: Subject to any disclaimer, the term of this patent is extended or adjusted under 35 U.S.C. 154(b) by 203 days.

(21) Appl. No.: 13/870,544

(22) Filed: Apr. 25, 2013

(65) Prior Publication Data

US 2014/0321295 A1 Oct. 30, 2014

(51) Int. Cl.
*H04L 12/24* (2006.01)
*H04L 12/26* (2006.01)

(52) U.S. Cl.
CPC ............. *H04L 41/069* (2013.01); *H04L 43/08* (2013.01)

(58) Field of Classification Search
CPC . H04L 41/06; H04L 41/0604; H04L 41/0609; H04L 41/0622; H04L 41/0631; H04L 41/064; H04L 41/0681; H04L 41/069; H04L 41/0695; H04L 43/08; H04L 43/0823
USPC .................................. 370/241, 242, 248, 252
See application file for complete search history.

(56) References Cited

U.S. PATENT DOCUMENTS

| | | | |
|---|---|---|---|
| 4,466,071 A | 8/1984 | Russell, Jr. | |
| 4,538,196 A | 8/1985 | Sun et al. | |
| 4,725,914 A | 2/1988 | Garitty | |
| 4,939,617 A | 7/1990 | Hoffman et al. | |
| 5,629,825 A | 5/1997 | Wallis et al. | |
| 5,956,074 A * | 9/1999 | Sclafani | 725/107 |
| 6,496,342 B1 | 12/2002 | Horvath et al. | |
| 6,654,216 B2 | 11/2003 | Horvath et al. | |
| 6,697,240 B2 | 2/2004 | Nelson et al. | |
| 6,940,702 B2 | 9/2005 | Kovovic et al. | |
| 7,139,668 B2 * | 11/2006 | Bechhoefer | 702/58 |
| 7,180,412 B2 | 2/2007 | Bonicatto et al. | |
| 7,180,717 B2 | 2/2007 | Kojovic et al. | |
| 7,570,469 B2 | 8/2009 | Guzman-Casillas et al. | |
| 7,599,161 B2 | 10/2009 | Premerlani et al. | |
| 7,725,295 B2 | 5/2010 | Stoupis et al. | |
| 7,745,956 B2 | 6/2010 | Ito et al. | |
| 7,747,356 B2 | 6/2010 | Andarawis et al. | |
| 7,860,615 B2 | 12/2010 | Nelson et al. | |
| 7,952,846 B2 | 5/2011 | Spiess | |
| 8,180,481 B2 | 5/2012 | Stergiou et al. | |
| 2002/0057544 A1 | 5/2002 | Sugiura et al. | |
| 2006/0176044 A1 * | 8/2006 | Binder et al. | 324/71.1 |
| 2007/0039035 A1 * | 2/2007 | Magin | 725/127 |
| 2007/0285857 A1 | 12/2007 | Berkowitz et al. | |

(Continued)

*Primary Examiner* — Chi H Pham
*Assistant Examiner* — Weibin Huang
(74) *Attorney, Agent, or Firm* — Volpe and Koenig, P.C.

(57) ABSTRACT

An apparatus for monitoring and measuring analog signal levels, current and reflected power (SWR) in an electric utility substation environment. The apparatus includes selective measurement capabilities for at least five individual frequencies, respectively, and includes programmable event recording and remote alarms. The apparatus will provide data to support in-band spectral analysis of recorded events, and can be located at any point along an associated communication path. The apparatus is non-intrusive and will not affect any existing signals present on an associated communication path.

22 Claims, 11 Drawing Sheets

(56) References Cited

U.S. PATENT DOCUMENTS

2008/0137246 A1 6/2008 Oda
2009/0154369 A1* 6/2009 Helvig et al. ................ 370/252
2010/0002348 A1 1/2010 Donolo et al.
2011/0251810 A1* 10/2011 Dzung et al. .................... 702/72
2012/0134061 A1 5/2012 Kasztenny et al.

* cited by examiner

POWER COMMUNICATIONS MONITOR FOR POWER LINE CARRIER AND AUDIO TONE COMMUNICATION SYSTEMS

FIELD OF THE INVENTION

This invention relates to the measurement of analog signals on a communication path, and more particularly for communication paths used in electric utility system protection.

BACKGROUND OF THE INVENTION

Electric Utilities use electronic communication systems in combination with Protection Relays to monitor transmission line conditions and provide control change commands when the transmission lines experience fault conditions. These fault conditions require immediate action to avert wide scale power outages and damage to expensive substation equipment. These Relays require a means to communicate these protection control states and command changes. Various communication paths are used to transmit and receive these critical commands. These communication methods include (but are not limited to) Power Line Carrier (PLC), Audio Tone, Analog and Digital Microwave, Fiber Optics and Spread Spectrum Radio. The physical location of the communication equipment is primarily within a relay house of a utility substation, and therefore is exposed to excessive environmental conditions including excessively high voltages, especially during fault conditions.

Two of the communication paths, Power Line Carrier (30 kHz to 500 kHz) and Audio Tone Systems (300 Hz to 4000 Hz) often multiplex many channels (frequencies) on a single path. While many newer transmitters and receivers now have some type monitoring of their own signals and some also the path in general, it is believed that no monitoring apparatus presently exists to independently monitor the communication path, or has the ability to monitor any selectable frequency.

Power Line Carrier Communications used for Power System Protection utilize the Electric Utility transmission line as the communication path. Various components are used to convert the transmission line into a viable path for Power Line Carrier (PLC) frequencies. If these components are not aligned properly, the misalignment can cause conditions that will adversely affect the signal. One method of determining proper system alignment is measuring the reflected power or Standing Wave Ratio (SWR). Power Line Carrier Systems are adjusted for minimal reflected power to assure maximum power transfer across the transmission line. Many things connected to the Transmission line affect the reflected power of the PLC system and conditions are constantly changing. Monitoring of reflected power (SWR) is an effective way to assure that the changing conditions of the transmission line do not adversely affect the original alignment of the PLC System and render it ineffective when needed. It is believed that present monitoring apparatus cannot externally monitor various frequency selective reflected power (SWR) measurements and assign alarm or status limits as programmed by the user.

The majority of monitoring devices presently manufactured for the Electric Utility substations now incorporates the ability to time stamp events that occur within the associated monitoring device that can be synchronized with satellite clocks. The time stamped events provide recorded event timelines that can be used to evaluate, locate, and remedy the defect on the communication path of the utility substations system. However, no substation hardened communication monitoring devices are believed to exist with the capability to monitor and retrieve such time stamped events locally or to a remote control site.

The present inventors recognize that Spectral Analysis of the Power Line Carrier path provides an opportunity for the Electric Utilities to evaluate the integrity of their control (or Trip) frequencies during the actual fault. During fault conditions, excessive noise conditions exist that can achieve the same levels of the control frequencies. In-band spectral analysis provides the user the ability to determine the Signal to Noise Ratio (SNR) during those conditions and provide valuable information for remedying mis-operations or loss of carrier signals.

SUMMARY OF THE INVENTION

In general, the present invention is a monitoring device or apparatus for use in power company substations, designed to provide programmable analog communications monitoring in the frequency range from 300 Hz to 500 kHz. The present monitoring device is capable of measuring up to five frequency selective voltages or currents simultaneously with various bandwidth options. Monitoring two channels at the same frequency (one for voltage and one for current) will provide reflected power (SWR) readings. The device is designed to be substation hardened. It has a built-in user programmable event recorder and a satellite clock input for event synchronization with other substation devices. When programmed by the user, time synchronized data recording will be performed that will provide the data needed for later review of in band Spectral Analysis of desired events.

BRIEF DESCRIPTION OF THE DRAWINGS

The following drawings, in which like items may have the same reference designations, are illustrative of embodiments of the present invention and are not intended to limit the invention as encompassed by the claims forming part of the application, wherein:

DETAILED DESCRIPTION OF THE INVENTION

Figure 1:
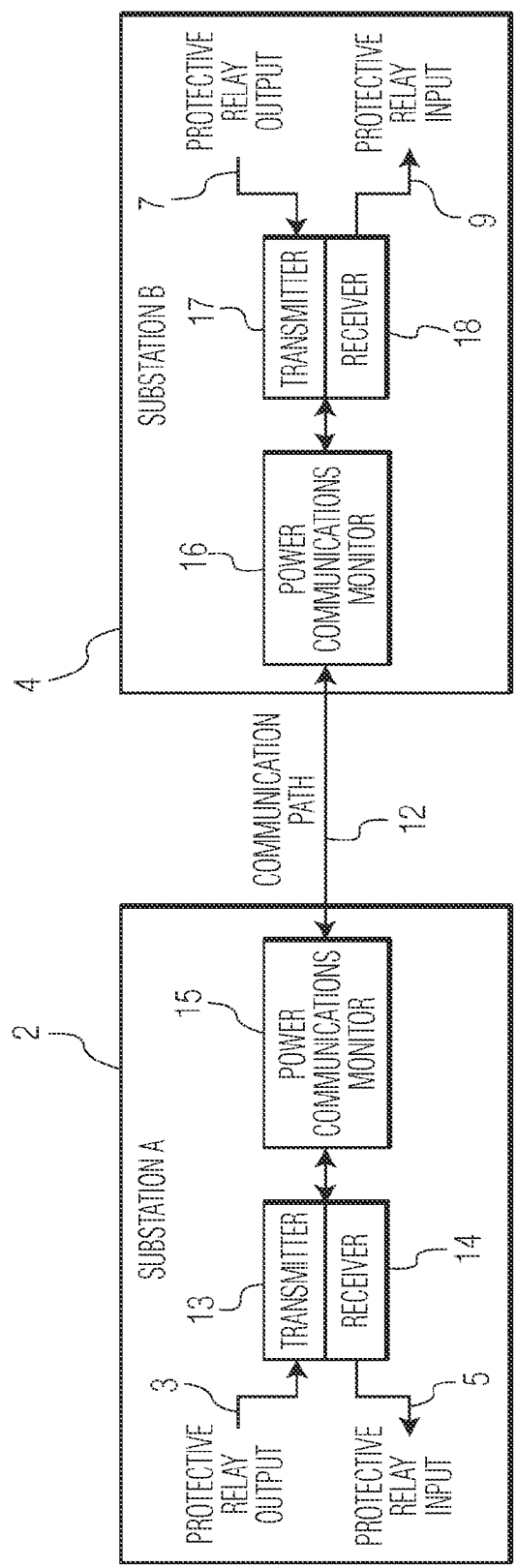
FIG. 1 is a general system block diagram identifying a desired location of where the invention can be used in an Electric Utility Substation relay house, for an embodiment of the invention.

In the system block diagram of FIG. 1, for two Substations A and B, as shown in blocks 2, 4, respectively, include there between a coaxial cable communication path 12 that typically utilizes Power Line Carrier transmission requiring one Power Communications Monitor device 15 or 16, for one embodiment of the invention. In another embodiment of the invention, a four wire bidirectional audio tone system can be utilized, in which the communication path 12 is connected to one wire pair and the receive path is connected to the other wire pair, whereby two identical Power Communications Monitor devices 15, 16, respectively, are required for bidirectional monitoring capability. A detailed description of the present inventive Power Communications Monitor devices 15 and/or 16 is provided below. In this example, the communication path 12 is meant to convey a coaxial cable communication path.

With further reference to FIG. 1, note that more than two Substations can be connected via associated communication paths 12 simultaneously. However, regardless of the connection of a plurality of Substations via communication paths 12, the operation of the present Power Communications Monitor 15 or 16 will not be affected. Since the channels being monitored are user selectable via user control of the present Monitor 15 or 16, the present Monitor 15 can be programmed to measure voltages and current relative to user selected frequencies. As shown, Substation A may include amongst other components a transmitter 13 receptive of an output signal from a protective relay (not shown) via input line 3, and a receiver 14 for providing an input signal along line 5 to the protective relay (not shown). The present Power Communications Monitor 15 bidirectionally monitors, the transmitter 13 and receiver 14. As further shown in the simplified block diagram of FIG. 1, Substation B includes substantially the same component configuration as Substation A. More specifically, the components of Substation B include a present Power Communications Monitor 16, a transmitter 17, a receiver 18, an output line 7 from another protective relay (not shown), and an input line 9 connected to the protective relay. Substation A is shown in block 2, and Substation B in block 4, and show the protective relaying communication system for Substation A, B, respectively. The Communication Path 12 can be provided by any viable present technology. However, in this example, the present Power Communications Monitor 15, 16, respectively, is designed to measure analog signals where power line carrier (RF) signals are sent over the power transmission lines, from which the signals are coupled to the coaxial cable of the Communication Path 12, in this example. Also note that within a single substation, such as Substation A, this Substation itself may include a plurality of individual component configurations as represented by block 2 or block 4. Regardless of the number of such substations employed, different frequencies are utilized to represent different protection channels within an individual substation, or substations along a shared communications path.

An example of the operation of Substations A and B, as represented by component blocks 2, 4, respectively, will now be provided. In Substation A when the transmitter 13 is keyed or energized via a control signal received from protective relay output line 3, transmitter 13 responds by transmitting a user programmed frequency to be received by both monitor 15, and receiver 18 of Substation B. Upon receiving the frequency signal from transmitter 13, receiver 18 responds by changing the state of the input line 9 to cause the associated protective relay to change from one operational state to another desired operational state, for example, to indicate a fault has occurred in Substation A. Similarly, in Substation B, when transmitter 17 is keyed or energized via the state of protective relay output line 7 changing, transmitter 17 responds by transmitting a voltage signal having a user programmed frequency to be responded to by receiver 14 and monitor 15 of Substation A. In response to receiving the control signal of a desired frequency from transmitter 17, receiver 14 changes the state of relay input line 5 to cause the associated protective relay to respond by performing a desired action to indicate a fault has occurred in Substation B. Note that the Power Communications Monitor 15 is responsive to the signal from transmitter 17 for directing that signal to receiver 14. Similarly Power Communications Monitor 16 is responsive to receiving a control signal from Power Communications Monitor 15 for transfer to receiver 18. In effect, as will be described in further detail below, the present monitor 15, and/or 16 are transparent to the associated communication path 12 in which they are installed.

The Power Communications Monitor 15 of Substation A can be programmed to monitor user selective levels of voltage having a user selected frequency. The monitor 15 records the time and date of events indicating specific analog communication conditions in the associated Substation A in this example, along with data, such as indicative of voltage and current of the event to permit a user to compute VSWR, and perform spectral analysis. By computing the voltage standing wave ratio (VSWR), a user obtains an indication of the associated reflected power at Substation A. Similarly, the present Power Communications Monitor 16 located in Substation B is user programmed for monitoring event associated levels of voltage and current at a given frequency, for time and date stamping events for recording, and for providing the recorded data for a user to permit computation of VSWR (reflected power) at each event, along with spectral analysis, relative to Substation B.

Figure 2:
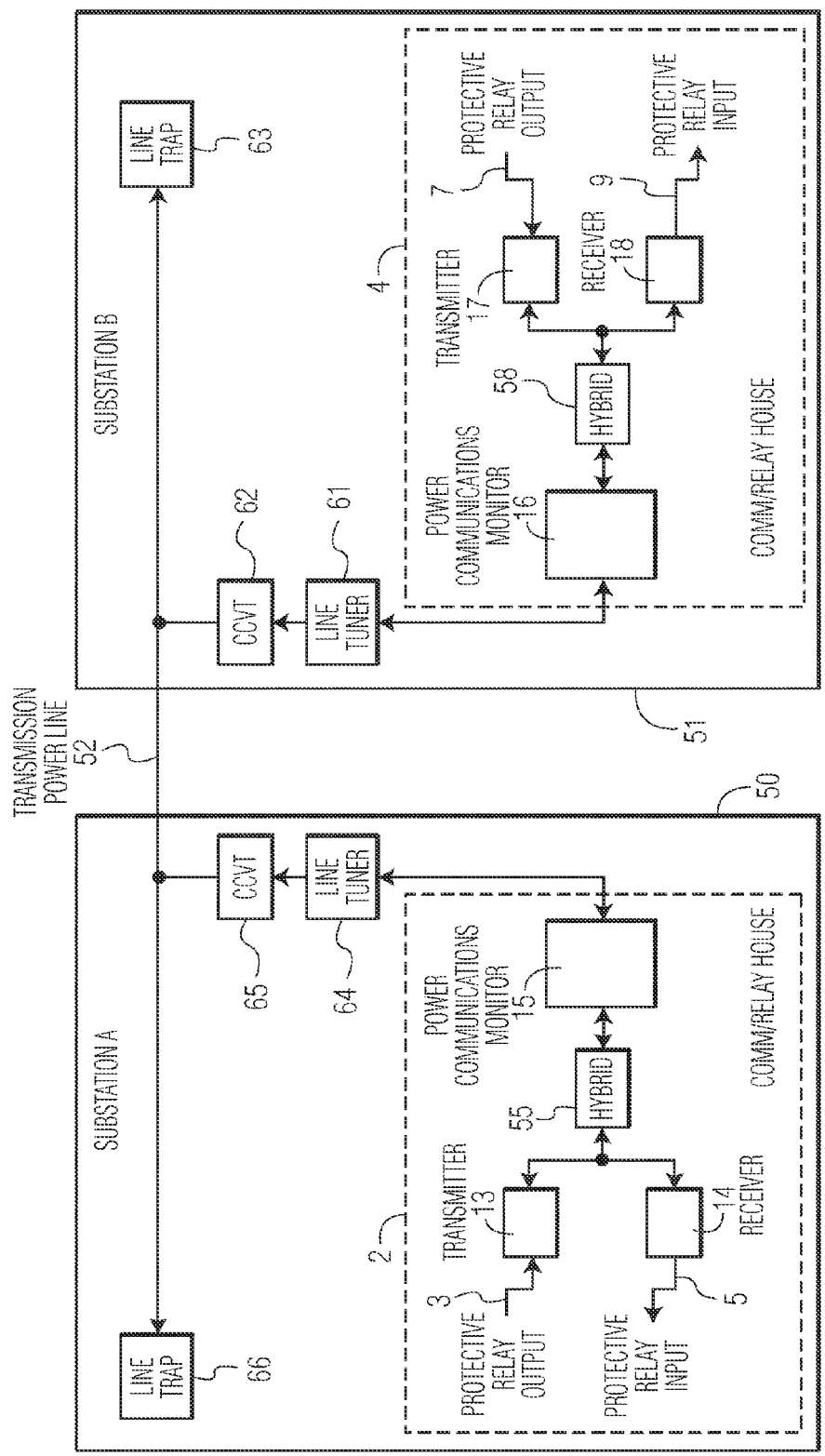
FIG. 2 is a Power Line Carrier system block diagram identifying a location where the invention can be used, for an embodiment of the invention.

In FIG. 2, a power line carrier system is shown in greater detail than FIG. 1. In FIG. 2, the positioning of the present Power Communication Monitor 15, 16 of the present invention can be anywhere in a coaxial cable communication path of a power utilities substation. The monitor 15, 16 provides monitoring of multiple protection channels on the communication or associated coaxial communication path. The Monitor 15 or 16 can be placed in other locations within the electrical power system coaxial cable communication path. In this example, monitor 15 is connected between a hybrid 55 within a communication relay house 2 of Substation A, and a line tuner 64. In Substation B, monitor 16 is connected between a hybrid 58 in communication relay house 4, and a line tuner 61, for example. For their locations shown, Monitors 15 and 16 monitor any signals that have been multiplexed or appear individually onto the associated communication path. It is common for four transmitters and four receivers to be utilized in substations 2 and/or 4, respectively, whereby the monitors 15 and 16 can record events on channels being monitored.

With further reference to FIG. 2, Substation A now represented by block 50 includes the series connection of a line trap 66, CCVT (coupling capacitor voltage transformer) 65, and line tuner 64. The line tuner 64 is also bidirectionally connected to a present Power Communications Monitor 15, the latter being located in a Communications/Relay House 2, in this example. Note that the component configuration in the Communications/Relay House 2 is substantially the same as in block 10 for Substation A of FIG. 1, except for the addition of a hybrid 55 bidirectionally connected between monitor 15, and transmitter 13 and receiver 14, as shown. Similarly, for Substation B as shown by block 51, components including a line trap 63, CCVT 62, and line tuner 61 are connected in series, with the line tuner 61 being bidirectionally connected to a Power Communications Monitor 16, the latter being located within a Communications/Relay House 4. The only difference between the configuration of the components within Communications/Relay House 4 and the components configurations shown in Substation B of block 11 of FIG. 1, is the addition of a hybrid 58 in Communications/Relay House 4, with the hybrid 58 being bidirectionally connected to monitor 16, and also bidirectionally connected to both transmitter 17 and receiver 18, as shown. The common connection between line trap 66 and CCVT 65 is connected to one end of a transmission power line 52 also serving as a communications path between Substations A and B. In Substation B, the common connection between the line trap 63 and CCVT 62 is connected to the other end of the transmission power line 52, as shown. Note that in a typical substation, such as Substation A or B, the coaxial cable communication path is typically located between an associated Line Tuner and associated transmitter/receiver.

More specifically, with further reference to FIG. 2, the component configuration shown in blocks 50 and 51 for Substations A and B, respectively, provide a more detailed representation of electrical power companies or utilities power line carrier protective relaying communication systems, in this example. Transmission power line 52 provides the utilities high voltage transmission line that in this example also serves as the utilities power line carrier (RF) communication path, as previously indicated. The operation of transmitters 13 and 17 is as previously described relative to FIG. 1. Hybrids, such as 55 and 58, are required when more than one power line carrier channel is present on a single communication path, such as served by transmission power line 52, in this example. More specifically, hybrid 55 is designed to provide the proper line impedance and necessary electrical isolation between transmitter 13 and receiver 14. Similarly, hybrid 58 is designed to assure the proper line impedance and electrical isolation between transmitter 17 and receiver 18, in this example. As previously indicated, a Power Communications Monitor 15 is included in Substation A, and a Power Communications Monitor 16 is included in Substation B. The use of the two Power Communications Monitors 15 and 16 as shown provides for optimized monitoring capability relative to signals and events. However, only a single Power Communications Monitor 15 or 16 is required if a less optimized system is acceptable, in this example.

With yet further reference to FIG. 2, the CCVT 65 (Coupler Capacitor Voltage Transformer) included in Substation A is required for coupling RF signals to transmission power line 52, in this example. Similarly, CCVT 62 in Substation B provides for coupling RF signals to transmission power line 52. The line tuner 64 in Substation A provides an adjustable inductor that is "tuned" to cancel the capacitive reactance introduced by CCVT 62 and CCVT 65 (of Substation B). Line tuner 64 also includes an impedance matching transformer. Line Tuner 61 provides in Substation B a similar function to line tuner 64 in Substation A. Note that typical power line carrier transmitters 13, 17 have a 50 or 75 ohm impedance output. The impedance of the transmission power line 52 typically can have a large variance of impedance values, but usually can range between 200 and 500 ohms. The impedance matching transformers of line tuners 64 and 61 are adjusted to best match the output impedance of their associated transmitters 13, 17, respectively, to the impedance of the transmission power line 52. When properly adjusted, line tuner 64 and 61 provide maximum power transfer of RF signals to the transmission power line 52 serving as a communication path, in this example. Accordingly, as indicated, each of the line tuners 64 and 61 provide the same function within their associated Substation A and B represented by blocks 50, 51, respectively. Line trap 66 in Substation A serves to maximize the power transfer of RF signals between substations, particularly remote substations such as might be represented by Substations B. When line trap 66 is properly tuned, it provides a high impedance relative to RF signals on the transmission power line path 52 serving as a communication path. Line trap 63 at Substation B provides the same function as line trap 66 at Substation A.

With reference to the Power Communications Monitor 15(16) of FIGS. 3A and 3B, and further reference to FIG. 2, operation of the present invention will now be described. In the preferred embodiment of the invention, terminal 20 receives an analog signal RF IN (Radio Frequency) from Hybrid 55(58) that enters the primary winding of current transformer 100. The current transformer 100 provides impedance matching, and electrical isolation between the monitor and the coaxial cable path. In typical operation, the primary winding current can range from 1 μa (microampere) to 2 amperes), for example, whereby the actual level of current is programmed by a user in setting the amplitude of RF IN. The secondary winding of current transformer 100 is connected to a current load resistor 101. If the current in the secondary winding of transformer 100 does not exceed xy milliamps (typically does not exceed a 2 volt drop across resistor 101), then it passes unattenuated through switch 102 to the current anti-alias filter buffer amplifier 104, which in this example has a gain of 0.499. If the current level exceeds xy milliamps, then the switch 102 (a solid state switch controlled by CPU 200) is activated via CPU 200 responding to the user's setting of RF IN, and the signal passes through the 40 dB input attenuator 103 for current measurement. Otherwise, RF IN passes unattenuated through switch 102. The signal then passes to the current anti-alias filter buffer amplifier 104. The current anti-alias filter buffer amplifier 104 reduces the signal level by 0.499, in this example. The signal then passes through the current anti-alias lowpass filter 105 which filters out all frequencies above 10 MHz, and passes lower frequencies. The signal then passes through the input gain operational amplifier 106 for current measurement. Gain of amplifier 106 is set by CPU 200 to one of five different gain setting. In this example, the settings are 1, or 5.64, or 31.8096, or 179.40614, or 1011.8551). The gain setting is set by CPU 200 in response to a user's prior programming for the amplitude of RF IN. The signal then enters an associated 16 bit current A/D (Analog-to-Digital Converter) 107, which converts the analog signal to a digitized signal that is inputted to the filter FPGA 207. The components between RF IN terminal 20 and the filter FPGA 207 provide measurement of current magnitude.

In the preferred embodiment, terminal 21 is receptive of an analog signal RF OUT from Line Tuner 61(64) that enters the primary winding of voltage transformer 108, the secondary winding of which is connected to a resistive load 109. The voltage transformer 108 provides impedance matching, and electrical isolation between the monitor and the coaxial cable path. A High Level Detector 116 monitors the voltage level across load 109. If the voltage exceeds 5 volts, the High Level Detector 116 outputs an INTR0 signal to CPU 200, in this example. CPU 200 responds by activating switch 110 to pass the signal through the 40 dB attenuator circuit 111. The signal then passes from attenuator circuit 111 through switch 110 to amplifier 112. Otherwise, the signal passes unattenuated through switch 110 to amplifier 112. The voltage anti-alias filter buffer amplifier 112 reduces the signal level by 0.499, in this example. The signal then passes through the voltage anti-alias lowpass filter 113, which filters out all frequencies above 10 MHz, and passes lower frequencies. The signal then passes through the input gain control amplifier 114 for voltage measurement. As with amplifier 106, the gain of amplifier 114 is set to one of five different gain settings (1, 5.64, 31.8096, 179.40614 & 1011.8551) controlled by CPU 200, in response to a user's prior programming of the amplitude of RF OUT. The signal then enters a 16 bit voltage Analog-to-Digital Converter 115, which converts the associated analog signal into a digitized signal, in this example. The digitized signal is inputted to the filter FPGA 207. The components between RF OUT terminal 21 and Filter FPGA 207 provide for measurement of voltage amplitude. The present monitors 15, 16 provide the capability of measuring up to five frequency selective voltages or currents simultaneously with various bandwidth options.

An external device is used to provide a timing reference. Terminal 22 is receptive of an IRIG-B series time code format signal. This input which has two electronic formats. Hardware jumper switch 117 is manually controlled to select which mode of the IRIG-B time code format is desired (modulated or unmodulated). If unmodulated, the Opto-coupler 118 deciphers the unmodulated signal and converts it to 3.3V CMOS (Complementary Metal Oxide Semiconductor) signal. If modulated, the signal will be isolated by transformer 119, and then pass through from the secondary winding of transformer 119 to buffer amplifier 120. Transformer 119 also provides impedance matching between the monitor and communication path. The output signal from buffer amplifier 120 passes to anti-aliasing lowpass filter 121, which passes signals having frequencies below 10 KHz. The output signal from filter 121 is passed through buffer amplifier 122 to analog-to digital-converter 123, which digitizes the signal and inputs it to FPGA 207 (Field Programmable Gate Array).

The Central Processing Unit (CPU) 200 controls all of the peripheral components in the system, which include the Complex Programmable Logic Device or Chip Selector (CPLD) 201, the CPU Flash Memory 202, the Real Time Clock (RTC) 203, the Event Flash Memory 204, the Static Random Access Memory (SRAM) 205, the Communication Field Programmable Gate Array (FPGA) 206, and the filter FPGA 207. The CPU 200 is a 150 MHz digital signal processor (Texas Instruments TMS320VC33), in this example. The Chip Selector 201 is an Altera Max2 CPLD, which is used by the CPU 200 to select a device for reading data from or writing data into. The CPU Flash Memory 202 stores the present monitor's 15(16) firmware. The Real Time Clock (RTC) 203 includes a Static RAM (SRAM) not shown, and is used by an interconnected device to keep time even in the event of loss of the IRIG-B satellite signal, and hold the user boot configuration while the unit is powered down. The Event Flash Memory 204 provides an event recorder database capable of recording up to 32,767 events, in this example, which is not meant to be limiting. The SRAM 205 is the memory for the CPU 200. The Communications FPGA (Field Programmable Gate Array) 206 controls bidirectional signal flow associated with the Ethernet port 213, USB (universal serial bus) port 214, and SD (secure digital interrupt) Card port 215 functions.

The Filter FPGA 207 performs SLM (Selective Level Meter) filtering, IRIG-B filtering, TRIG-B UART (universal asynchronous receiver/transmitter), and Communication UART. FPGA 207 also is controlled by CPU 200 to output control signals via Buffer 208 to selectively operate a plurality of alarm switches 209 to selectively provide one or a combination of ALARM 1 through ALARM 4 signals, and/or drive Light Emitting Diode (LED) array 210 for selectively activating one or a combination of LED 1 through LED 8 to alert a user to fault conditions. The FPGA 207 is also controlled via CPU 200 to provide bidirectional signal flow via RS-232 port 211, and RS-485 port 212.

The main Power Supply 300 converts input voltages ranging from 24 to 150 VDC to a 12 VDC output. Power Supply 301 is a redundant supply used in case of Power Supply (300) failure. The low voltage Power Supply 302 converts the 12 VDC to +1.2 VDC, +1.8 VDC, +3.3 VDC, +5 VDC and −5 VDC for connection to various of the components of the present system.

The CPU 200 is programmed to control operation of the present monitoring system 15 (16). Firmware flowcharts as shown in FIGS. 4A through 4E provide details for the programming of CPU 200, and the operation of the present system as described in greater detail below. Necessary calculations by a user based upon stored detected signals provide data for user calculation of SWR, rms voltage and current, wattage, and so forth, can be calculated via use of software library No. rts30gr.lib of Texas Instruments, for example. Note each substation in a power utility system can have ten or more channels multiplexed on a single path. Two channels may be at the same frequency with one channel representing voltage, and the other channel current, for use in making the aforesaid necessary calculations for the associated substation.

Figure 3:
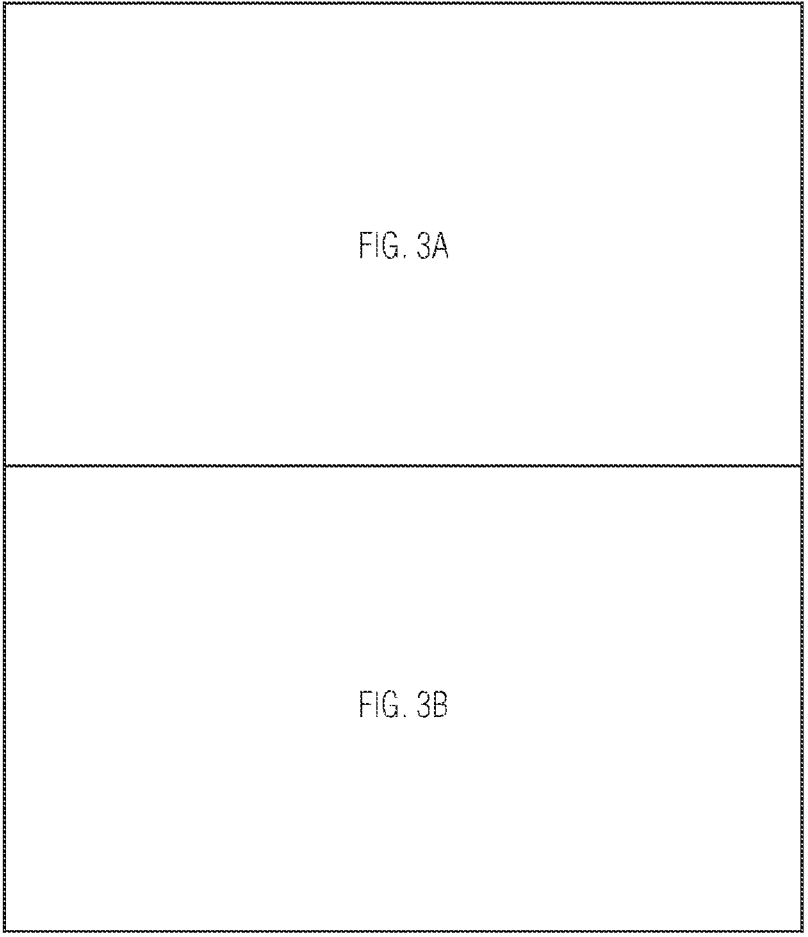
FIG. 3 shows that it is represented by the combination of FIGS. 3A and 3B as described immediately below.
Figure 3:
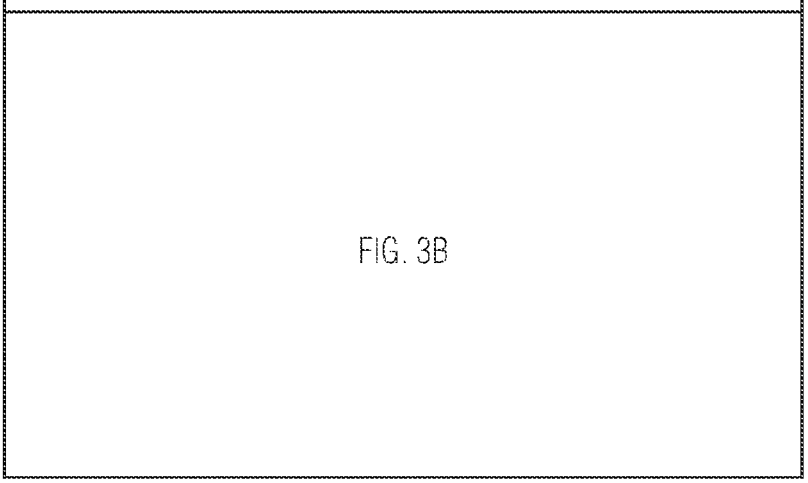
Figure 4A:
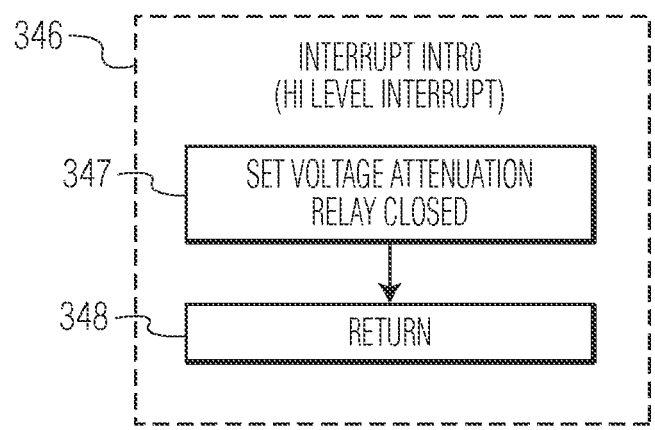
FIGS. 4A through 4E show a firmware block diagram (flowchart) for the invention.

Further reference is now made to the flowchart or firmware block diagram for the present monitor 15(16) shown in FIGS. 4A-4E. In FIG. 4A, in broad terms, step 346 provides Interrupt INTR0 control signal, a high level detection interrupt. Sublevel steps included in step 346 include 347, in which the INTR0 signal is outputted from high level detector 116 causing CPU 200 to respond by operating switch 110 to change state for passing the RF OUT signal through 40 dB attenuator 111, as previously described. After a predetermined period of time, in substep 348 CPU 200 operates to deactivate switch 110, returning it to its normal or rest state as shown in FIG. 3. At that time the control program returns to where it last left off.

Figure 4B:
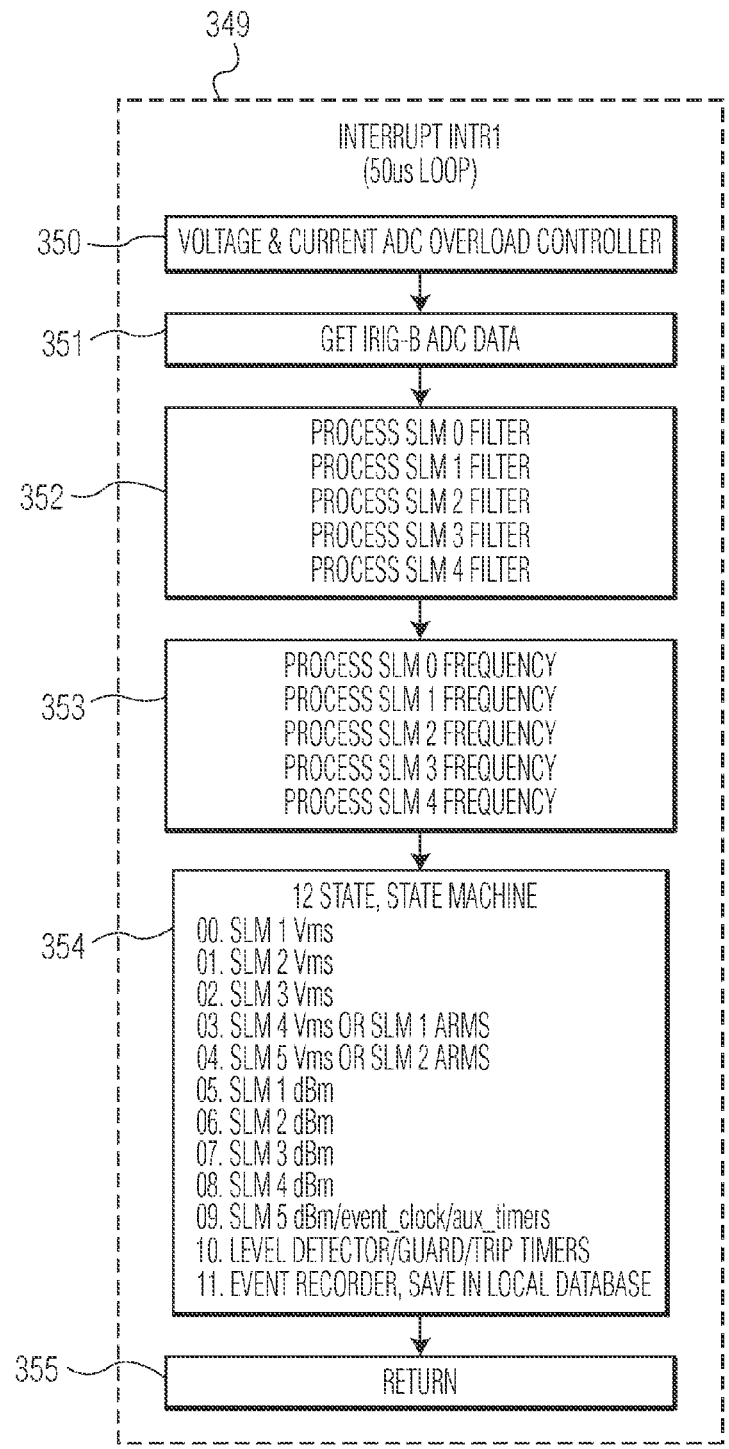

With further reference to FIG. 4B, step 349 is an Interrupt INTR1 associated with a 50 microseconds loop. Step 349 includes substeps 350 that monitors the A/D converters 107, 115, 123 for long or short overloads. In step 351, if the aforesaid modulated IRIG-B option is set, the IRIG-B A/D converter data is loaded into A/D 115. In step 352 the SLM or selective level meter data from the Process SLM 0 through 4 Filters are processed relative to the associated five frequencies or channels, respectively. The data is obtained from the third operational amplifier 106 and associated A/D 107 for current. Next in step 353 SLM 0 through 4 channel or frequencies are processed, from operational amplifier 114 and associated A/D 115 for voltage. In substep 354 a "12 State Machine" is provided to calculate the following values:

00. SLM 1 Vrms01; SLM 2 Vrms02; SLM 3 Vrms03; SLM 4 Vrms or SLM 1 Arms 04; SLM 5 Vrms or SLM 2 Arms05; SLM 1 dBm06; SLM 2 dBm07; SLM 3 dBm08; SLM 4 dBm09; SLM 5 dBm/event_clock/aux_timers10; and Level detector/GUARD/TRIP Timers 11. An Event Recorder saves these values in a local database.

The values are used by the user to extract the data from ports 211-214.

In substep 355 the program returns to where it last left off.

Figure 4C:
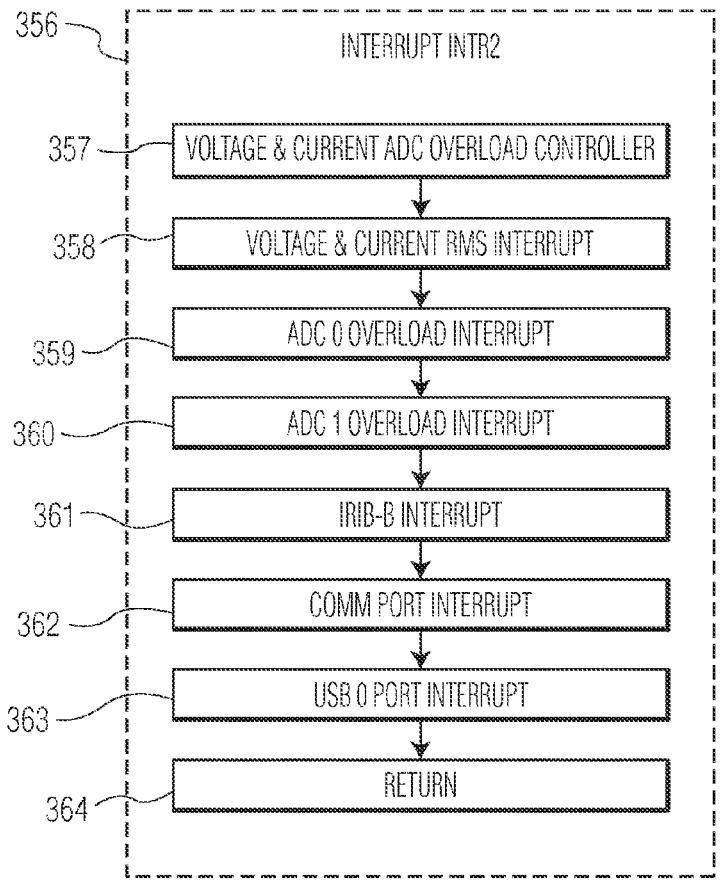

Interrupt INTR2 step 356 shown in FIG. 4C. This step is carried out by substeps 357 through 364. In substep 357 a voltage and current A/D converter overload controller (not shown) output is monitored to provide the blocking mechanism for AGC (automatic gain control) when there is an overload. In step 358 the wideband RMS current and voltages are obtained from the FPGA 207. CPU 200 responds to INTR1, whereby if the auto mode attenuator 103 and/or gain of amplifier 106 is charged until the overload is overcome. In step 359, if a current overload is detected in A/D 107 converter an overload interrupt is generated by FPGA 207 as INTR1. Substep 360 detects whether there is a voltage overload relative to A/D converter 115, and if so, generates a voltage overload interrupt as INTR2, and CPU 200 responds by checking FPGA 207 to determine if A/D 107 or 115 is overloaded. If the latter, then if in an auto mode Attenuator 111 and/or amplifier 114 gain is changed. Regardless, the overload is not corrected if a user is in a manual mode. In Substep 361 IRIG-B Interrupt is generated to interrupt CPU 200 to get the latest satellite time. In step 362 a COMM port Interrupt signal is generated via a received byte from the Serial Port-RS-232/RS-485 (see FIG. 5). It interrupts CPU 200. In step 363 a USB 0 port Interrupt signal is generated when data is available from USB, to permit CPU 200 to access the data. In substep 364 the program returns to where it last left off before pursuing step 356.

Figure 4D:
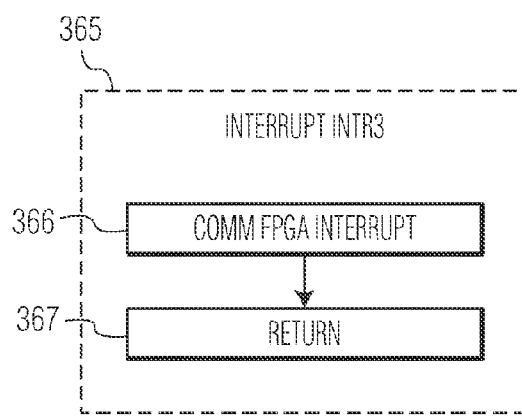

Interrupt INTR3 step 365 is now entered as shown in FIG. 4D. This step includes substep 366 that causes a COMM FPGA 206 Interrupt signal to be generated to read Ethernet port 213. In step 367 the program returns to where it left off.

Figure 4E:
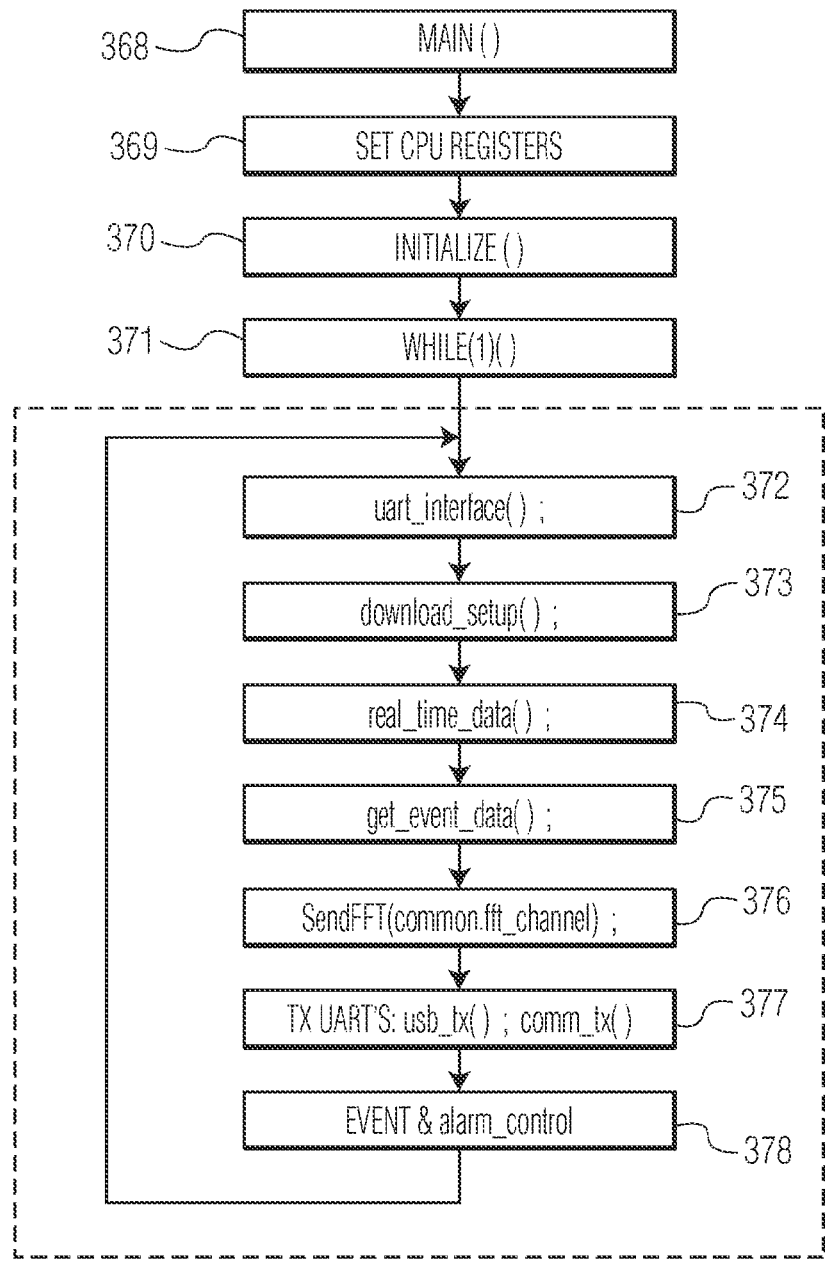

Reference is now made to the flowchart of FIG. 4E. Main step 368 is followed by step 369 to set the CPU 200 registers (not shown). Step 370 is then entered to provide initialization of various parameters. In step 371 a WHILE Loop 380 is entered into. Note that a WHILE Loop in most computer languages, is a control flow statement that allows code to be executed repeatedly based on a given Boolean condition. The While Loop can be thought of as a repeating if statement, for maintaining previous processed information or data. More specifically, in this example, the WHILE Loop 380 allows the monitor system to pickup where it left off from an interrupt. Step 372 provides a uart (universal asynchronous receiver transmitter) interface which transmits and receives data external to the monitor 15 (16), and is software driven to insure the transmission of data. Step 373 provides a software driven download setup for external applications, such as an embedded web server, to permit a user to check the settings or programming of the monitor. Step 374 packages generated real time data from CPU 200 for external applications to be available at an output port (211-214, respectively). Step 375 provides for packaging recorded event data on the SD card for external applications. Step 376 provides packages in the SD card FFT (Fast Fourier Transform) data for external applications. Step 377 transmits uart (universal asynchronous receiver transmitter) data to any port. Step 378 provides for operation of a software event recorder and alarm controller database stored in Event Flash 204.

Figure 5:
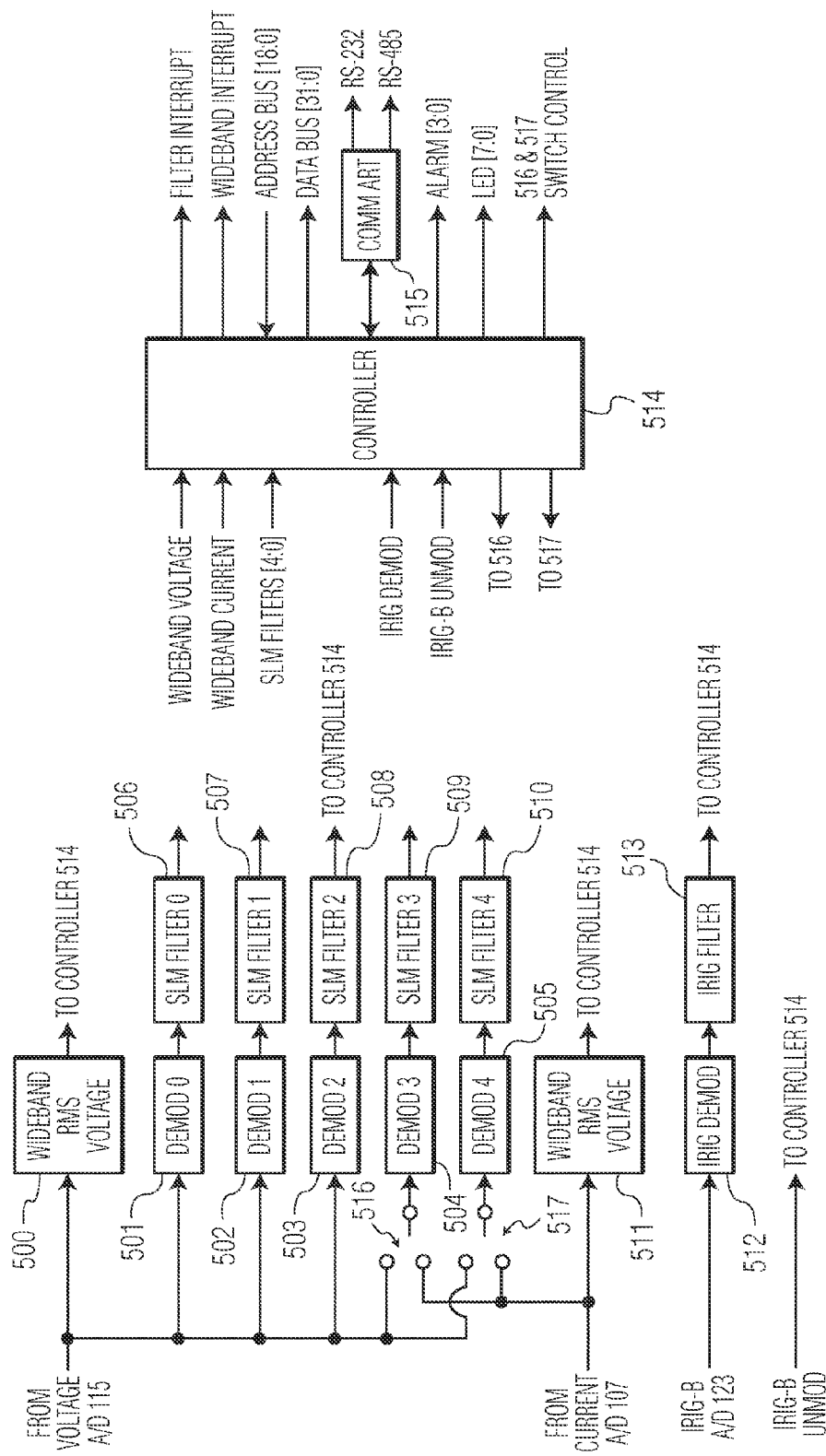
FIG. 5 is a filter FPGA (Field Programmable Gate Array) block schematic diagram, for an embodiment of the invention.

FIG. 5 is a block schematic diagram of the FILTER FPGA 207 of FIG. 3. As shown, the digitized signals from A/D 115 are received by a Wideband RMS Voltage 500 module which calculates Wideband RMS Voltage values from the digitized signals, and inputs the values to controller 514. The voltage representative digitized signals from AD 115 are also inputted to demodulators 501 through 505, which in turn provide demodulated signals thereof to SLM (selective level meter) filters 506 through 510, respectively. The filtered output signals from SLM filters 506 through 510 are inputted into controller 514. Digitized current representative signals from A/D converter network 107 are inputted to a Wideband RMS Current calculator module 511, which calculates RMS current values therefrom, and inputs the values to controller 514. Switch 516 is operative to connect either the voltage A/D 115 signals to demodulators 504 and 505, or the current A/D 107 signals to demodulator 504 and 505. CPU 200 controls controller 514 to operate switches 516 and 117. Either switch 516 or 517 is activated to measure current via associated demodulators 504, 505, respectively, to permit RMS calculation by a user. Switch 517 is operative to selectively connect either voltage A/D 115 signals or current A/D 107 signals to demodulators 504 and 505, respectively, to further permit a user to calculate RMS values therefrom.

With further reference to FIG. 5, an IRIG-B signal from A/D 123 is inputted into an IRIG demodulator 512 that demodulates the serial time code format for input to an IRIG filter 513, to provide the latest timing signals. The output of filter 513 is inputted to controller 514. Also, an IRIG-B unmodulated signal is inputted to controller 514 from A/D 123. Controller 514 provides an interface to external buses. COMM UART 515 (Communicator for universal asynchronous receiver transmitter) provides an interface with all communication options via the RS-232 and RS-485 signal lines or ports.

With further reference to FIG. 3, as previously mentioned, the present monitor 15, 16, is relatively transparent to the substation in which it may be located somewhere in the coaxial cable communication path. For example, a monitor 15, 16 connected as shown in FIG. 2, with RF IN terminal 20 connected to hybrid 55, 58, respectively, and RF OUT terminal 21 connected to line tuner 64, 61, respectively, the impedance of the primary winding of transformer 100 is maintained as low 0.1 ohm, whereas the impedance of the primary winding of transformer 108 maintained at about 40 kilohms. As a result, even if the power is not being applied to monitor 15 or 16, or during the powering of monitor 15, 16, the connection between hybrid 55 and line tuner 64, and hybrid 58 and line tuner 61, will be maintained via monitors 15, 16, respectively.

Note further that a user can program CPU 200 in a manual mode to permit the user to extract stored data from the event/memory 204 for obtaining the times and dates of successive events, and data from the SD Card for calculating and displaying a Fast Fourier Transform (FFT) output data to provide spectrum analysis associated with given ones of the events. The user in order to calculate an FFT must select one frequency or channel between 30 kHz to 0.5 MHz, in this example. The user also selects the bandwidth they wish to view, whereby the user can program a monitor 15 or 16 to select up to five different bandwidths. Also, a user can program CPU 200 for putting the associated monitor 15, 16 into an automated mode, which will restrict a user to only have the ability to measure the VSWR subject to a given event.

A user determines the current level range for detection by the present monitor 15, 16. A user can make this selection via Ethernet port 213 or USB port 214, the selection being made via Communication FPGA 206 inputting the selection to CPU 200. In turn, CPU 200 responds to the current level selection by setting the gain for operational amplifier 106. In a similar manner, the gain for operational amplifier 114 is set in response to the voltage level range for detection set by a customer or user.

With further reference to FIG. 3, the Filter FPGA 207 (also see FIG. 5), permits up to five channels or frequencies to be processed, as previously described. For each of the demodulators 501 through 505, the CPU 200 sets the output or intermediate frequency (IF) outputted from each demodulator. The SLM filters 506 through 510 block frequencies from 5 kHz and above, and pass IF signals having frequencies lower than 5 kHz, whereby the IF signals passed are inputted into controller 514, as previously mentioned. The controller 514 provides signals for a given event to the CPU 200, whereby the CPU 200 directs the event signals for storage to the Event Flash 204.

Figure 3A:
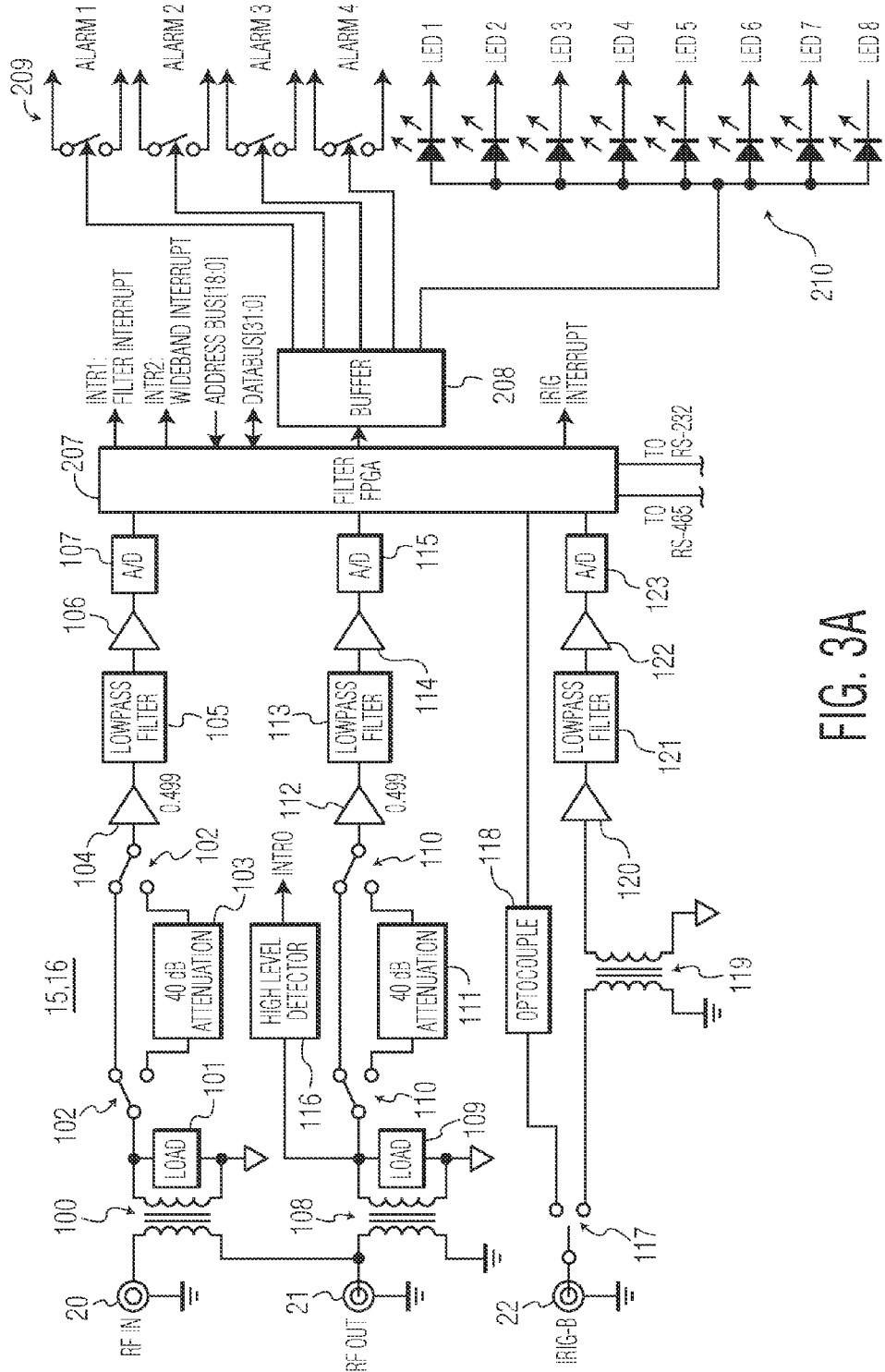
FIGS. 3A and 3B represent a block circuit schematic diagram for a Power Communications Monitor for an embodiment of the invention.
Figure 3B:
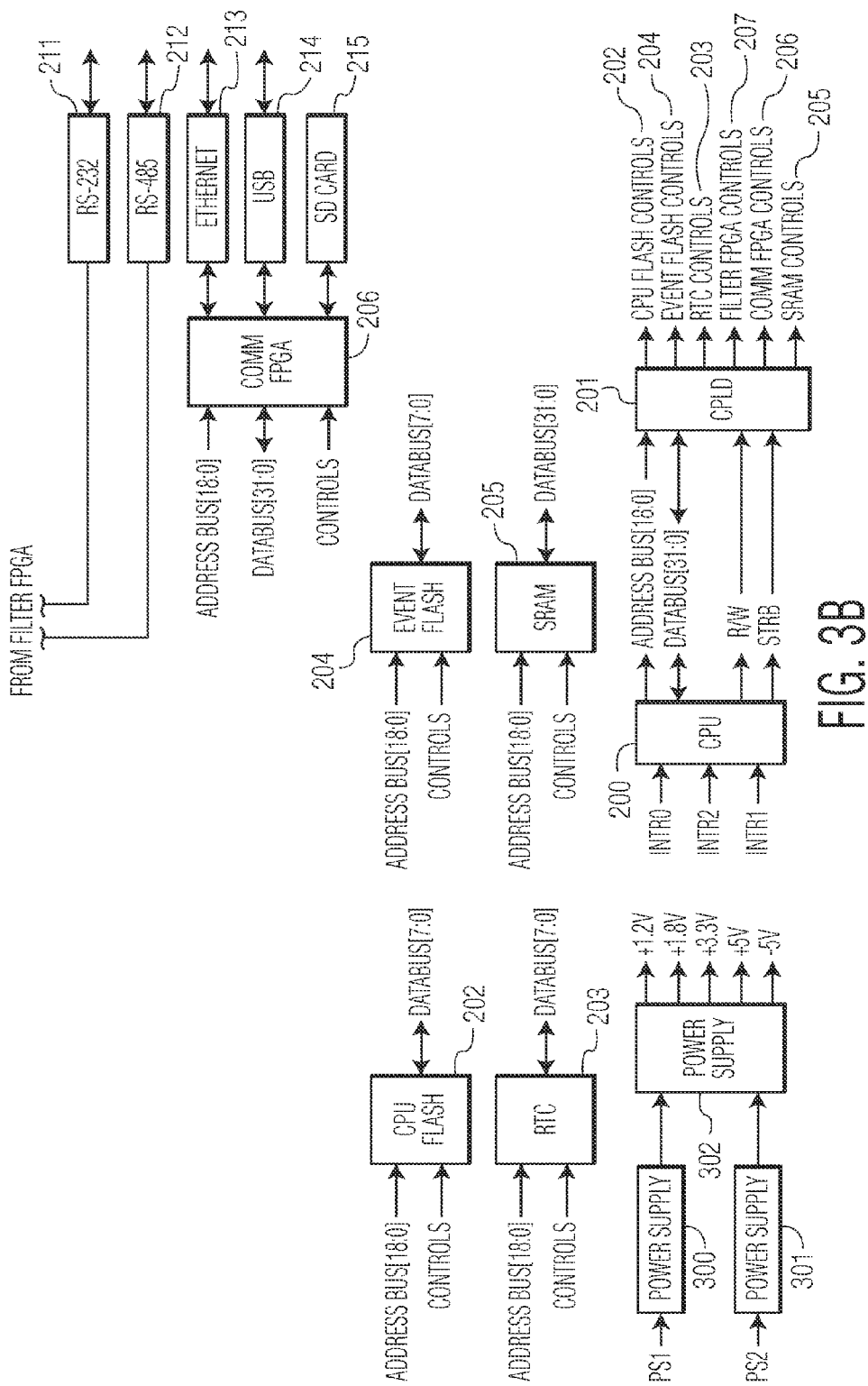

With further reference to FIGS. 3A and 3B, note that Alarm lines 1 through 4, and LED's 1 through 8, are activated when events first occur, and thereafter, all subsequent events are recorded. With regard to typical events that can be recorded, such events may include High Frequency Detected, Center Frequency Detected, Low Frequency Detected, Signal Out of Range High, Signal Out of Range Low, SWR out of Range. Further, the aforesaid listing of events is not meant to be limiting, numerous other events may occur. Note further that the CPU Flash memory 202 stores the programming for firmware for the CPU 200. Also, the RTC 203 maintains timing to be independent of the satellite provided IRIG-B signal, when a monitor 15, 16 is turned off. The SRAM 205 continuously stores ongoing operations during a particular period of operation, and is reset when power is turned off. In other words, SRAM 205 is a volatile memory. Note further that the CPU Flash memory 202 receives data from the FPGA 207 every 50 microseconds, in this example.

With further reference to FIG. 2, the Substation A when the protective relay output line 3 changes state as a result of a change in state of its associated protective relay (not shown), the state change such as a change from a 0 to a 1 state, or vice versa, triggers transmitter 13 to output a signal to hybrid 55. As previously mentioned, the signal has a user predetermined frequency. Transmitter 13 typically uses FSK (frequency shift key) or AM (amplitude modulation) keying, as previously programmed by a user (typically the power company). Also, with regard to a given transmitter, such as transmitter 13, a user typically selects a frequency for the signal ranging 300 Hz to 500 kHz.

Note that the demodulated signals provided to controller 514 via SLM filters 506 through 510 provide demodulated waveforms having sine and cosine portions, presenting a complex wave with a real and imaginary portion. The signals are provided to CPU 200. As previously mentioned, the CPU 200 for each event, stores the time and date of the event, an indication whether the event is represented by a high frequency, low frequency, center frequency, low level signal, or by the VSWR being out of range. The CPU 200 also puts data into the SD Card for permitting a user to retrieve these data and compute an FFT analysis thereof to permit spectrum analysis. Operation of monitor 16 in Substation B is substantially the same as that described for monitor 15 and Substation A. When a given monitor 15 or 16 receives a transmitted signal from another substation, the monitor can only use the signal to record that an event has occurred, and that the event was caused by shifting in frequency previously programmed.

The Communications FPGA 206 controls Ethernet port 213, and USB port 214 using database and address buses connected to CPU 200.

The buffer 208 provides a user with voltage isolation between the FPGA 207 and the Alarm lines 1 through 4. A user can manually program their connection to any of the Alarm lines. Also, a user can program CPU 200 to activate each of the LED 1-8 light emitting diodes to each show an individual event occurrence.

The RS-232 port 211 is typically hardwired to a communication device, individually and with a protocol for point-to-point connection. The RS-485 port 212 can be hardwired to communicate with a plurality of devices.

In summary, the user of a monitor 15, 16 is provided the ability to select signal frequencies and/or channels for recording events as they occur on the associated communication path. A user can also select the bandwidth to be recorded relative to the selected frequencies. Also, a user can select or program data desired to be recorded to provide a user the ability to compute from past event occurrences the FFT from the data in order to perform spectrum analysis. In other words, monitors 15, 16 provide real time measurements and the ability to record data for immediate or later use by a user to observe events happening at given times in order to determine if a particular substation is operating properly. As required, a user can reprogram signal frequencies and voltage levels, at any time. Another important feature provided by monitor 15, 16 is to permit a user to program the monitor to record data at regular set intervals for providing trending analysis. For example, a recording can be provided every hour, every twenty-four hours, and so forth. Such data recording would be conducted regardless of whether there is the occurrence of a particular event.

Figure 6:
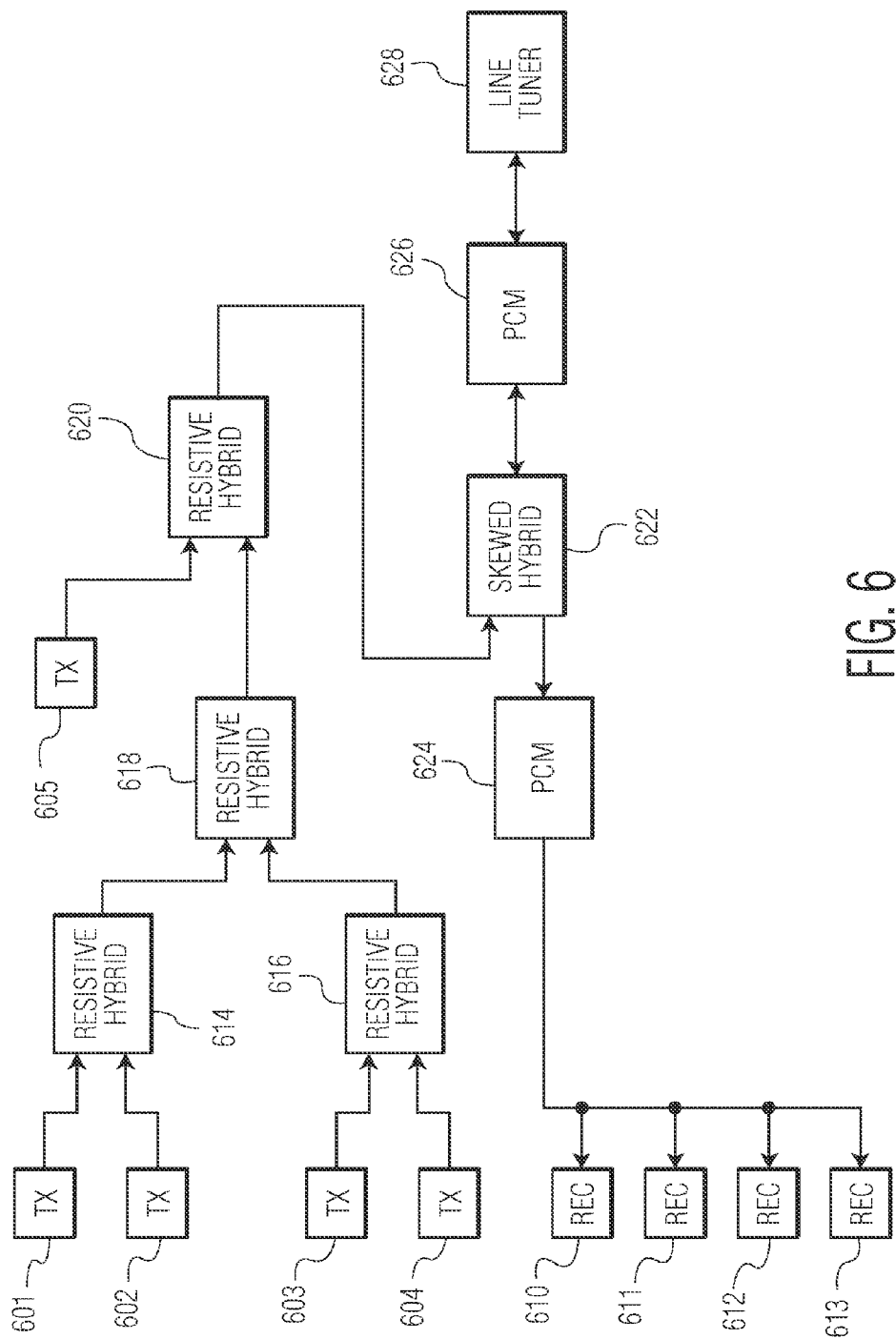
FIG. 6 is a block diagram illustrating the application of the present invention in a substation incorporating a plurality of transmitters and receivers, for an embodiment of the invention.

With reference to FIG. 6, as previously indicated, in a power substation a plurality of transmitters and receivers may be used. In the example shown, five transmitters 601 through 605 are being utilized, along with four receivers 610 through 613. Each of the transmitters 601 through 605 upon receiving a change of state signal from an associated protective relay (not shown) transmit a signal of a user preset frequency, with the frequencies between transmitters 601 and 605 each typically being different. A resistive hybrid 614 is receptive of output signals from transmitter 601 and 602, and in this example serves to multiplex the two signals together should they occur at the same time. Similarly, resistive hybrid 616 is receptive of output signals from transmitter 603 and 604, and serves to multiplex the two signals together even if they occur at the same time. Output signals from resistive hybrid 614 and resistive hybrid 616 are inputted into a resistive hybrid 618, which in turn multiplexes the aforesaid output signals together. The output of resistive hybrid 618 is inputted to another resistive hybrid 620, which is also receptive of an output signal from transmitter 605. The output from resistive hybrid 620 can be representative of the multiplexed combination of the output signals from transmitter 601 through 605, the multiplexed signals being inputted into a skewed hybrid 622. The skewed hybrid 622 is bidirectionally connected to a present Power Communications Monitor (PCM) 626, the latter being bidirectionally connected to the line tuner 628, as shown. The interconnection of the present monitor 626 to the skewed hybrid 622 and line tuner 628 is substantially the same as the above-described interconnection of a present monitor 15 to a line tuner 64 and hybrid 55. However, in this example, the monitor 626 may at times have to simultaneously process five transmitted signals of different frequencies multiplexed together, in this example. With further reference to FIG. 5, the transmitted signals are respectively demodulated by demodulators 501 through 505, and passed through associated SLM filters 506 through 510, respectively, to controller 514. These signals are then further processed for recording the occurrences of the related events and the event/memory 204, and recording data in the SD card for later use by a user to calculate associated Fast Fourier Transforms (FFT) therefrom, to permit spectrum analysis.

With further reference to FIG. 6, a second present monitor or PCM 624 is receptive of output signals from the skewed hybrid 622 for processing signals received from other substations that may be connected to the associated substation, for outputting the signals indicative of the occurrence of events from these other substations, which output signals are individually received by receiver 610 through 613, respectively.

It should be noted that in power line carrier channels or coaxial communication paths, the purpose of hybrid circuits is to enable the connection of two or more transmitters together on one coaxial cable without causing intermodulation distortion due to the signal from one transmitter affecting the output stages of the other transmitter, in addition to other purposes as indicated above. Also in typical power substations the purpose of line tuners in conjunction with coupling capacitors (CCVT, for example) is to provide a low impedance path for the carrier energy to the transmission line and a high impedance path to the power frequency energy. The line tuner/coupling capacitor combination provides a low impedance path to the power line by forming a series resonant circuit tuned to the carrier frequencies. However, the capacitance of the coupling capacitor or CCVT is a high impedance to the power frequency energy. Although not shown in the figures, coupling capacitors have a high impedance at power frequencies, whereby a path to ground must be provided for the capacitor to function properly, and is typically provided by a drain coil (not shown) in the present figures. Also, typically, the carrier energy on the transmission lines must be directed toward a remote line terminal and not towards a substation bus, and must also be isolated from bus impedance variations. Line traps provide this isolation function, and are usually provided by a parallel resonant circuit which is tuned to the carrier energy frequency. The parallel resonant circuit provides a high impedance at its tune frequency, thereby causing most of the carrier energy to flow toward a remote line terminal. Also, a coil (not shown) of the line trap provides a low impedance path for the flow of power frequency energy, which is typically substantially large. As a result, the coils used in typical line traps must be large in terms of physical size. The use of line tuners, resistive hybrids, skewed hybrids, CCVT's, and line traps are well known in the power industry.

Although various embodiments of the present invention have been shown and described, they are not meant to be limiting. Those of skill in the art may recognize certain modifications to these embodiments, which modifications are meant to be covered by the spirit and scope of the appended claims.

What is claimed is:

1. A power communications monitor for insertion at any point in a coaxial cable communication path of a power substation, comprising:
    means for measuring the voltage amplitude of event related signals as they occur in said communication path;
    means for measuring the magnitude of current of said event related signals;
    means for recording the time and date of the occurrence of each event related signal; and
    means for making said monitor transparent to said coaxial cable communication path, wherein said transparent means includes a low impedance connection of said monitor between its insertion points in said communication path.

2. The monitor of claim 1, further including means for processing simultaneously a plurality of event related signals having the same or different frequencies.

3. The monitor of claim 1, further including means for recording data obtained from said event related signals to permit the calculation of the standing wave ratio (SWR) at an insertion point in said communication path.

4. The monitor of claim 1, further including means for processing said event related signals to obtain and record data for permitting trend analysis for the occurrence of said signals over predetermined successive periods of time.

5. The monitor of claim 1, further including means for processing each of said event related signals to obtain and record data that is indicative of either one or more of a shift in frequency, in amplitude, and standing wave ratio (SWR), from preprogrammed values.

6. The monitor of claim 1, further including means for processing each of said event related signals to obtain and record data for spectrum analysis thereof.

7. The monitor of claim 1, wherein said transparent means include:
    a first transformer having a primary winding with one end connected to one end of the break in said communication path, for receiving a radio frequency input (RF IN) signal;
    a second transformer having a primary winding with one end connected to another end of the break in said communication path, for receiving a radio frequency output (RF OUT) signal, another end of said primary winding of said second transformer being connected to a source of reference potential;
    another end of the primary winding of said first transformer being connected to the one end of said second transformer; and
    said means for making said monitor transparent to said communication path includes making the impedance of the primary winding of said first transformer low enough to permit signals to flow unimpeded between the ends of the break in said communication path, and making the impedance of the primary winding of said second transformer substantially relatively higher than that of the primary winding of said first transformer.

8. The monitor of claim 7, wherein the impedance of the primary winding of said first transformer is about 0.1 ohm, and the impedance of the primary winding of said second transformer is about 40,000 ohms.

9. The monitor of claim 7, wherein said current magnitude measuring means includes: said first transformer having a secondary winding;
    a first load connected across said secondary winding for developing a first secondary voltage there across;
    means connected to said load for adjusting the amplitude of said first secondary voltage relative to a user' preprogrammed amplitude therefor;
    a first analog to digital convertor (A/D) receptive of the adjusted first secondary voltage for digitizing it;
    a filter field-programmable gate array (FPGA) receptive of said digitized voltage from said first A/D from each event monitored;
    a data storage memory; and
    a central processing unit (CPU) including means for operating said FPGA for processing said digitized voltage to obtain data relative to the magnitude of current for storage in said data storage memory for later retrieval by a user.

10. The monitor of claim 9, wherein said voltage magnitude measuring means includes:
    said second transformer having a secondary winding;
    a second load connected across said secondary winding for developing a second secondary voltage there across;
    means connected to said second load for adjusting the amplitude of said second secondary voltage relative to a user's preprogrammed amplitude therefor;
    a second A/D receptive of the adjusted second secondary voltage for digitizing it;
    an event flash memory;
    said filter FPGA receptive of said digitized second secondary voltage from said second A/D;
    a CPU including means for operating said FPGA for processing said second secondary voltage for recording the date and time of occurrence of the related event signal in said event flash memory, for later retrieval by a user; and
    said CPU including means for processing said digitized voltage to obtain data relative to the magnitude of current for storage in said data storage memory for later retrieval by a user.

11. The monitor of claim 10, whereby a user is provided means for retrieving data from said data storage memory for computing one or more of standing wave ratio (SWR), a shift in frequency of an event signal of interest from a user preprogrammed frequency, and a shift in amplitude of an event signal of interest from a user preprogrammed amplitude.

12. The monitor of claim 10, whereby a user is provided means for retrieving data from said data storage memory for computing spectrum analysis relative to an event signal of interest.

13. The monitor of claim 10, whereby a user is provided means for retrieving data from said data storage memory for deriving trend analysis from events occurring over predetermined successive periods of time.

14. The monitor of claim 10 further including:
    alarm means operable by said FPGA for issuing at least one alarm signal in response to the occurrence of an event in which a user preprogrammed value for a related event signal has deviated by a predetermined amount away from the user preprogrammed value.

15. The monitor of claim 14, further including:
    at least one visual alarm indicator operable by said FPGA upon the occurrence of an event.

16. The monitor of claim 1, further including means for simultaneously processing at least five event related signals having the same or different frequencies.

17. The monitor of claim 1, wherein said monitor is inserted between a hybrid and a line tuner in the coaxial cable communication path of an associated power substation.

18. A power communication monitor for insertion into a coaxial communication path of an electrical power substation comprising:
    means for simultaneously measuring voltage and/or currents of a plurality of signals having the same or different frequencies ranging from 300 Hz to 500 kHz;
    means for recording events associated with said signals; and
    means for time stamping each recorded event.

19. The monitor of claim 18, further including: means for communicating the occurrence of time stamped events to a user.

20. The monitor of claim 19, further including:
    means for monitoring first and second channels at the same frequency;
    upon the occurrence of an event, said first channel being measured for voltage, and said second channel being measured for current; and
    means for providing the voltage and current measurements to a user for calculating reflected power (SWR).

21. The monitor of claim 20, further including: means responsive to user programming of said monitor for assigning alarm or status limits for SWR, frequency, and voltage amplitude of monitored signals.

22. The monitor of claim 21, further including: alarm means for issuing an alarm in response to an alarm or status limit being exceeded.

\* \* \* \* \*

UNITED STATES PATENT AND TRADEMARK OFFICE
CERTIFICATE OF CORRECTION

| | | |
|---|---|---|
| PATENT NO. | : 9,166,876 B2 | Page 1 of 1 |
| APPLICATION NO. | : 13/870544 | |
| DATED | : October 20, 2015 | |
| INVENTOR(S) | : Fella et al. | |

It is certified that error appears in the above-identified patent and that said Letters Patent is hereby corrected as shown below:

IN THE CLAIMS
In claim 9, at column 14, line 32, delete "user'" and insert therefor --user's--.

Signed and Sealed this
Fifteenth Day of March, 2016

Michelle K. Lee
*Director of the United States Patent and Trademark Office*